Dec. 5, 1950  J. A. KINGSTON  2,532,557
APPARATUS FOR COOLING MILK AND
FOR FILLING MILK CONTAINERS

Filed May 20, 1947  2 Sheets-Sheet 2

Inventor
J. A. Kingston,
By
E. F. Obenderoth
Attorney

Patented Dec. 5, 1950

2,532,557

UNITED STATES PATENT OFFICE 2,532,557

APPARATUS FOR COOLING MILK AND FOR FILLING MILK CONTAINERS

Jonas A. Kingston, Reading, England, assignor to Gascoignes (Reading) Limited, Reading, England, a British company Application May 20, 1947, Serial No. 749,379
In Great Britain October 31, 1945

Section 1, Public Law 690, August 8, 1946
Patent expires October 31, 1965

2 Claims. (Cl. 226—70)

This invention relates to apparatus for cooling milk and for filling milk cans, and has particular reference to such cooling and filling apparatus for use with vacuum operated milking machines. The cooling means employed is of the kind in which the milk to be cooled is caused to descend as a thin stream or film over a corrugated surface cooled by a cooling liquid.

One of the main objects of the present invention is to provide an improved apparatus in which the cooling of the milk and the conveying of the cooled milk into cans for transport purposes are effected in dust-free vacuum sealed conditions.

Another object of the invention is to provide cooling apparatus in which an existing or known type of cooler unit of corrugated wall form may be employed, the arrangement being such that the cooler unit may be readily removed for washing or inspection.

A further object of the invention is to provide an apparatus in which the cooler unit can be readily washed and steam sterilized whilst in the operating position when required.

A still further object of the invention is to provide means which operate to arrest the delivery of milk to any one can of a group and to divert the milk to another can when the milk in the first can attains to a prearranged filling level.

Figure 1:
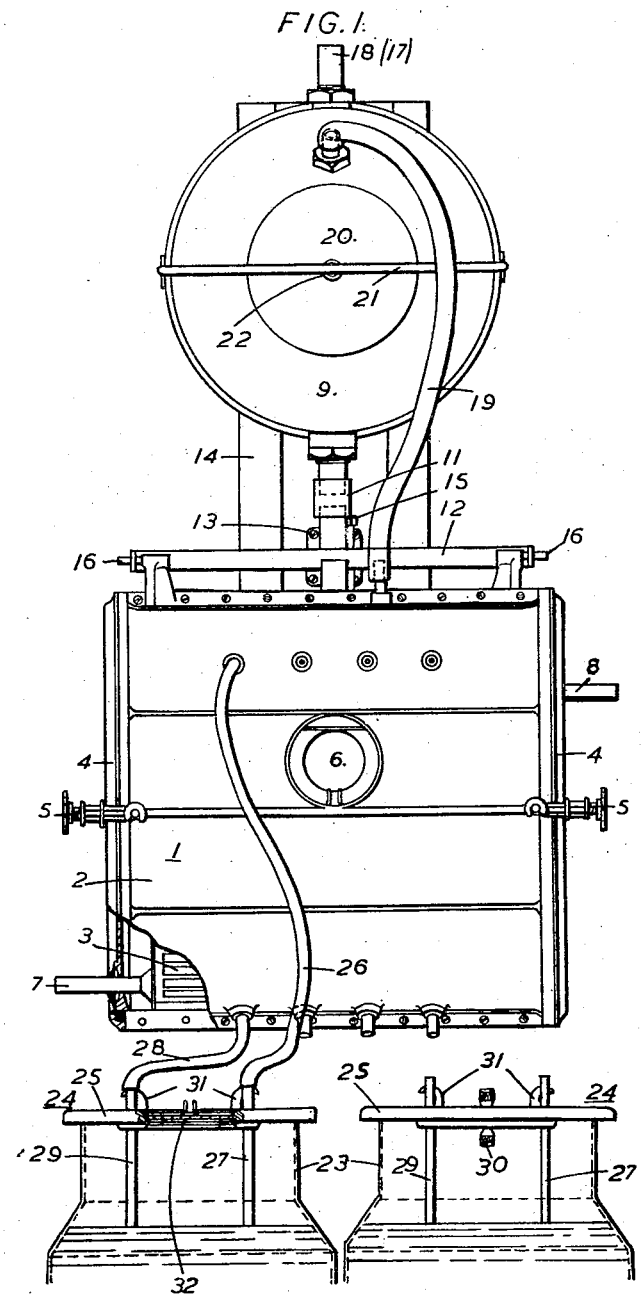
Figure 2:
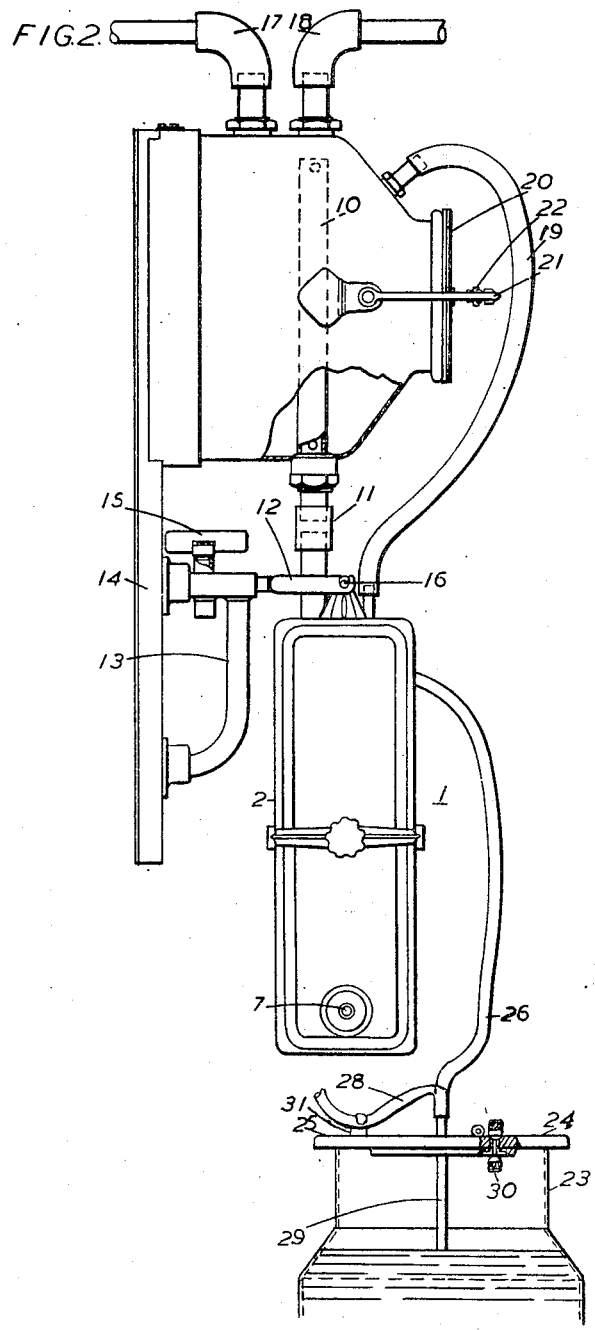

The invention is illustrated by way of example in the accompanying drawings wherein:

Figure 1 is a front view of the apparatus, and
Figure 2 is a side view thereof.

In the embodiment illustrated the cooling chest 1 consists of a body 2 of open-end horizontal tunnel form so that a cooler unit 3 may be inserted into the chest at either end. The open ends of the chest body 2 are closed by covers 4 which are lightly held in position by suitable fastenings 5. The body 2 is provided with a glazed window 6 for viewing the flow of milk over the cooler unit 3. During periods of use of the apparatus the state of vacuum within the chest draws the covers tightly on to airtight seatings around the open ends of the chest body 2. The cooler unit 3 employed is of a known construction consisting of a double wall corrugated chamber extending between a pair of vertical end plates having a connection 7, for admitting a cooling liquid, usually either water only or water and brine to the space between the double walls of the corrugated chamber and a connection 8 for discharging it to waste or for recirculation. Milk is discharged from vacuum-operated milking machinery into a milk-receiving vessel 9 and the milk to be cooled is delivered from the receiving vessel 9 through a perforated stand pipe 10 and a flexible connector 11 into the top distributor trough or tray of the cooler unit 3, and the cooled milk flows therefrom towards a sump on or in the floor of the chest. The chest 1 is mounted on a stand or adjacent to a wall at a suitable height above the level of the tops of the cans to be filled. A suitable supporting means comprises a self-levelling bar 12 swivel mounted on a bracket 13 carried by a plate 14 attachable to a wall surface. A clamping screw 15 retains the bar 12 and the chest 1, suspended therefrom on pivot pins 16, in the self-levelled position.

The milk receiving vessel 9 is provided at the top with a milk delivery pipe 17 and a vacuum pipe 18 and is connected to the top of the chest 1 by means of a flexible vacuum pipe 19 which maintains the vessel 9 and chest 1 at the same condition of vacuum. The vessel 9 is provided with a removable door 20 and a pivoted bail 21 with clamping screw means 22 for holding the door 20 in position.

When the cans are to be filled, each can 23 is fitted with a detachable head 24 consisting of a disc or shallow cap 25 which is adapted to rest on the mouth rim of the can 23 with an annular sealing ring or gasket on the disc 25 in contact with the can rim. Flexible piping 26 is attached to a tube 27 mounted on the disc 25 and thus connects the exhausted interior of the chest 1 with the head space in the can 23 under the disc 25 so that similar conditions of vacuum exist within the interior of the can 23 capped by the can head 24 as exist within the chest 1. Cooled milk from the sump of the chest 1 is delivered to the can 23 by another length of flexible piping 28 and another tube 29. Each can head 24 is furnished with means whereby the delivery of cooled milk to the associated can 23 is arrested automatically when the milk attains to a prearranged level in the can. To this end the vacuum tube 26 and the milk delivery tube 29 on each can head 24 both project down into the can 23 to the normal filling level, so that when the milk in the can 23 eventually reaches the openings of the vacuum tube 27 and the milk delivery tube 29, the vacuum tube opening is sealed off by the milk, and, since the milk delivery pipe is full of milk, no further displacement of air from the can takes place. It is to be realised that a partial vacuum only is created within the can 23 and that some air must be displaced to allow milk to enter it. Because there is a head of milk in the milk delivery piping 28 and tube 29 the residual air in the head space of the can 23 will be slightly compressed and therefore the milk level in the can will rise slightly above the lower end of the tube 29 thereby providing a positive seal. When more than one can at a time is connected to the chest for filling (two cans are shown in Fig. 1), it is unlikely that both or all the cans 23 will become full at the same moment and one can will usually be filled to the prearranged working level before any of the others. Milk will then no longer flow into the filled can, but the flow will continue into the other cans until another can is filled to working level. The vacuum system cannot become flooded after the last of the cans has been filled as milk cannot enter the vacuum system until both the cooler chest 1 and the milk receiving vessel 9 are completely full. Means are also provided in connection with each can head 24 so that the "vacuum" on any can 23 may be broken and the can head 24 removed when the can is filled or at any time during the process of filling the can. To enable this to be effected an air outlet valve or tap 30 is provided which may consist of a manually operable member or dumb-bell form normally held by gravity in a position in which it seals an air inlet orifice in the disc 25. The flow of air through the flexible pipes 26 and 28 into the chest 1 when the can head 24 is removed from the can 23 may be arrested by doubling or "kinking" said pipes 28, 26 and holding them thus by clipping the piping under hooks 31 provided on the disc 25. Alternatively use may be made for the same purpose of a clip which when a rubber pipe is inserted therein pinches the rubber pipe so as to close the bore thereof. Each can head 24 may be fitted with a window light 32 to permit of viewing the filling operations.

I claim:

1. Apparatus for cooling milk and for filling milk cans comprising in combination a support; a vacuum vessel mounted on said support and adapted to receive milk from vacuum-operated milking machinery; a dust-proof tunnel-like chest detachably and horizontally mounted on said support below said vacuum vessel; a milk cooler removably installed within said chest; a first pipeline connecting said vacuum vessel to said chest to supply milk to the cooler in the chest; a second pipeline connecting said vacuum vessel to said chest so as to provide in the chest the same condition of vacuum as obtains in the vacuum chest; at least one can head adapted to rest on the rim of an open-top milk can to cover the can mouth in air-tight manner, said can head being connected to said chest by first and second pipelines respectively for conveying cooled milk from the chest to the covered can and to provide in said covered can the same condition of vacuum as obtains in the interconnected vacuum vessel and chest and both of said pipelines being stopped off by and when milk accumulating in the can reaches a predetermined level, further inflow of milk to the can being thereby arrested automatically.

2. Apparatus for cooling milk and for filling milk cans, comprising in combination, a vertical back plate; a vacuum vessel attached to said back plate and adapted to receive milk from vacuum-operated milking machinery; a bar swivel mounted on said back plate below the vacuum vessel; a dust-proof tunnel-like chest pivotally suspended in pendulum manner from said bar; means for clamping the swivel bar in a self-levelled position; a milk cooler removably installed within said chest; a first pipeline connecting said vacuum vessel to said chest to supply milk to the cooler in the chest; a second pipeline connecting said vacuum vessel to said chest so as to provide in the chest the same condition of vacuum as obtains in the vacuum chest; a plurality of can heads each suspended from the chest by a pair of pipelines attached to a pair of tubes extending through the can head and each formed so as to be capable of forming an airtight cover for a milk can down into which extend the two tubes on the can head so that when milk delivered from the vacuum vessel to the covered can via the cooler chest and the interconnecting pipelines reaches a predetermined level the ends of said tubes are stopped off by the milk and the flow of milk into any can automatically ceases without interfering with the supply of milk to the other cans.

JONAS A. KINGSTON.

REFERENCES CITED

The following references are of record in the file of this patent:

UNITED STATES PATENTS

| Number | Name | Date |
| --- | --- | --- |
| 2,006,393 | Hapgood | July 2, 1935 |
| 2,317,589 | Collinson | Apr. 27, 1943 |
| 2,349,780 | Weinreich et al. | May 23, 1944 |
| 2,380,771 | McDonald | July 31, 1945 |